Oct. 3, 1933.  F. J. BECHERT  1,928,959
SPRING END CONNECTION
Filed Nov. 3, 1928
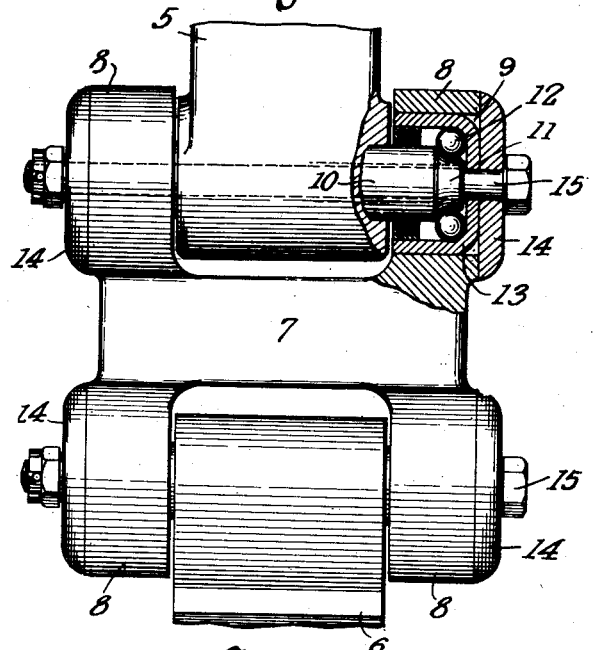
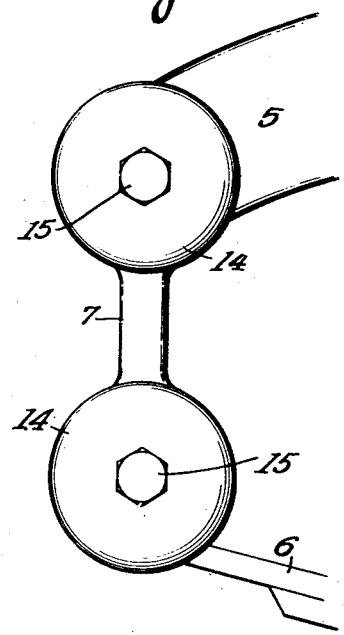
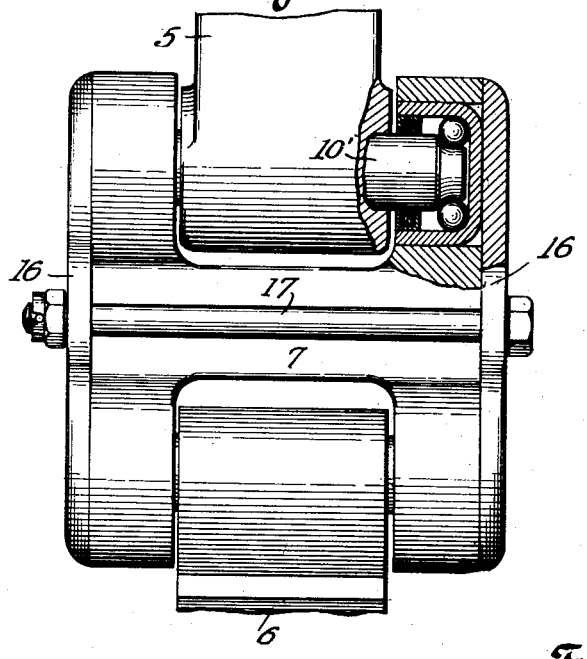
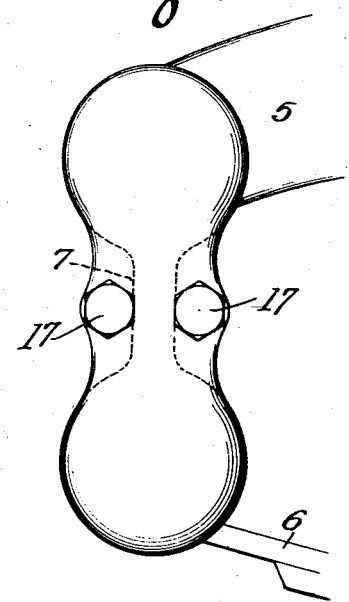
INVENTOR
Fred J. Bechert
BY Mitchell Bechert
ATTORNEYS Patented Oct. 3, 1933

1,928,959

UNITED STATES PATENT OFFICE 1,928,959

SPRING END CONNECTION

Fred J. Bechert, Stamford, Conn., assignor to The Fafnir Bearing Company, New Britain, Conn., a corporation of Connecticut Application November 3, 1928. Serial No. 316,911

3 Claims. (Cl. 267—54)

My invention relates to an antifriction spring shackle construction for connecting the frame and spring of a motor vehicle.

The general object of the invention is to provide a rigid spring shackle construction, which is simple, readily manufactured, and easy of assembly and disassembly.

Other objects will appear as the specification proceeds.

Briefly stated, in a preferred form of the invention, I provide a rigid shackle member, preferably of one piece and provided at opposite ends with a pair of spaced apart aligned bores. The bores of each pair at opposite ends of the shackle member are spaced apart a distance sufficient to permit the accommodation of a spring and frame. The spring and frame carry antifriction bearing member raceways, and antifriction bearing members, such as balls, are interposed between the raceways carried by said spring and frame and the bores in said shackle member. Cover members are provided for the ends of said bores and serve to position the antifriction bearings in said bores. The cover members are rigidly held in place on said shackle member by means independent of the raceways carried by said spring and frame.

In the drawing which shows, for illustrative purposes only, preferred forms of the invention—

Fig. 1 is an end view of a spring and frame connected by one form of my improved shackle construction, parts being shown in section for purposes of illustration;

Fig. 2 is a view in side elevation of parts shown in Fig. 1;

Fig. 3 is a view similar to Fig. 1, but illustrating a slight modification;

Fig. 4 is a view in side elevation of parts shown in Fig. 3.

In said drawing, 5 indicates a frame, while 6 indicates a spring member connected thereto by means of my improved shackle. In the forms illustrated I employ a rigid shackle member or link 7 of unitary or integral construction. At each end of the shackle member are spaced bosses 8—8, provided with aligned bores, as 9, therein. Since the shackle construction is substantially symmetrical, only one corner has been shown in section and a description of that corner will suffice as a description of the other three.

The bores, as 9, in opposite bosses 8—8 are aligned and are preferably of uniform diameter throughout, though this is not of the essence of the invention. The frame 5 is provided with suitable means, such as a pin 10, which, in the form shown, has antifriction raceways as 11 formed directly thereon at each end. Antifriction bearing members, such as balls 12, are interposed between the raceways 11 and the bores 9. In the form shown I employ a separate bearing raceway member, in this case the outer bearing raceway 13, which fits the bore 9 and is positioned endwise by means of a cover cap 14, which closes the end of each bore. The pin 10 is hollow and a through bolt 15 serves to rigidly secure the cover members 14—14 for aligned bores rigidly to the shackle link. The through bolt 15 is independent and preferably free of the pin 10, so that, during the action of the shackle, there is no binding action, and since the complementary raceways are inclined, both radial and end thrust loads are taken by the antifriction bearing members themselves and there are substantially no rubbing surfaces to wear and cause squeaks. The construction for the spring end shown at the lower portion of Figs. 1 and 2 is substantially the same as that heretofore described.

In the form shown in Figs. 3 and 4, the general construction is the same, but I provide a single cover 16 for the bores at opposite ends of the link and on the same side. Through bolts 17—17 intermediate the bearings serve to rigidly hold the cover caps in place. With that form of the invention shown in Figs. 3 and 4 the pin means 10' may be solid, since the through bolts, as 17, do not pass through the pins.

It will be seen that, with the construction herein disclosed, the parts may be readily assembled and the construction will be exceedingly rigid.

By definitely spacing the raceways 11—11 at opposite ends of each pin and similarly spacing the cover caps 14—14 apart, the outer raceways will be definitely spaced apart, and when the parts have been properly made the antifriction bearing members will have just the desired fit on their raceways.

While I have described the invention as connecting the frame and spring of a motor vehicle, it is to be understood that the spring, in some cases, may be connected directly to the axle, and I therefore wish to use the term "frame" in its generic sense and cover such a construction, since obviously the invention is not dependent upon connecting the spring and actual frame of a motor vehicle.

While the invention has been described in considerable detail and specific forms illustrated, I do not wish to be strictly confined to the forms shown, since obviously changes may be made within the scope of the invention as defined in the appended claims.

I claim:

1. In a shackle construction, a shackle link having a pair of spaced apart antifriction bearing means at opposite ends thereof for the purpose described, and a common means at the outer side of said link for holding two of the antifriction bearing means at opposite ends of said link.

2. In a shackle construction, a shackle link having a pair of spaced apart antifriction bearing means at opposite ends thereof for the purpose described, securing means at the outer side of said link for holding two of said antifriction bearing means at opposite ends of said link, and common means for holding said securing means in place.

3. In a shackle construction, a rigid shackle link having a pair of spaced apart aligned bores therein at opposite ends thereof, antifriction bearing means in said bores, two cover plates for holding all of said antifriction bearing means in said bores, and means for securing said cover plates to said link.

FRED J. BECHERT.